A. HITT.
TORSION BALANCE FOR SCALES.
APPLICATION FILED MAR. 1, 1907.
935,846.
Patented Oct. 5, 1909.
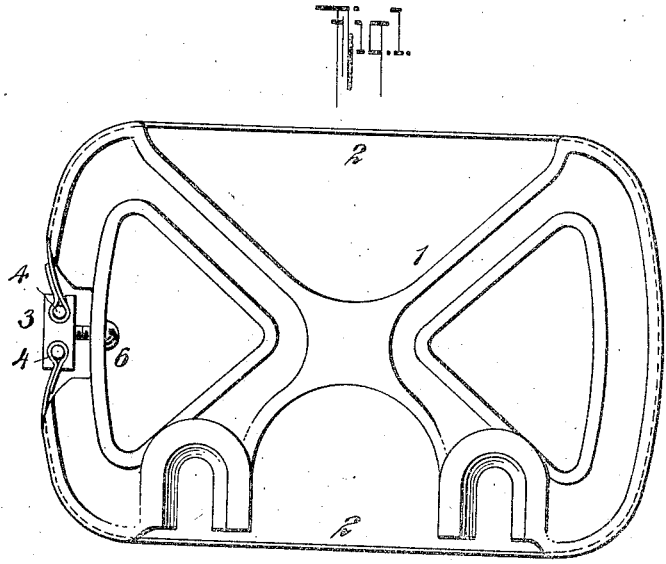
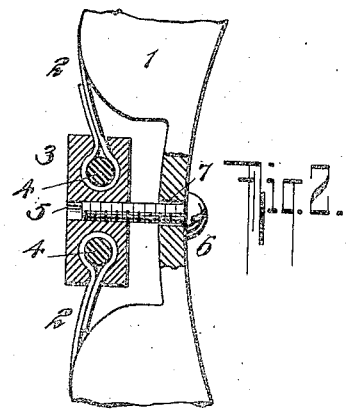
WITNESSES
INVENTOR
Adrian Hitt,
BY A. M. Pierce,
ATTORNEY.

UNITED STATES PATENT OFFICE.

ADRIAN HITT, OF JERSEY CITY, NEW JERSEY.

TORSION-BALANCE FOR SCALES.

935,846.  Specification of Letters Patent.  Patented Oct. 5, 1909.

Application filed March 1, 1907. Serial No. 359,930.

*To all whom it may concern:*

Be it known that I, ADRIAN HITT, a citizen of the United States, residing at Jersey City, in the county of Hudson and State of New Jersey, have invented certain new and useful Improvements in Torsion-Balances for Scales, of which the following is a specification, reference being had therein to the accompanying drawing.

My invention relates especially to the construction and arrangement of the springs employed in torsion balances or scales, and has for its object the provision of means and mechanism for easily and accurately regulating the tension of such springs in order to obtain the requisite harmony required in scales of this character.

To attain the desired end, my invention consists essentially in the combination with a torsion scale truss, of a spring stretched around its periphery, and means for regulating the tension of said spring, all of which will be hereinafter first fully described, and then pointed out in the claims.

In the drawing, Figure 1 is a side elevation of a truss and spring embodying my invention. Fig. 2 is an enlarged view of the spring straining mechanism.

Like numerals of reference, wherever they occur, indicate corresponding parts in both figures.

1 is a truss made of suitable material.

2 is a spring stretched around the periphery of the truss, the ends of the spring being held in a block 3 by means of pins 4. The block 3 is screw-threaded at 5, a screw 6 passing through a perforation 7 in the truss 1 engaging the thread 5.

As heretofore constructed, the springs used in torsion scales or balances have had their meeting ends welded, brazed or riveted together, and after placing in position on the periphery of a truss, the requisite strain to acquire the proper pitch or tone of the spring was obtained by expanding the truss by pressure applied to the center thereof. Before the scales were sent out from the factory the several springs used therein were tuned to harmonize. Such springs are liable to break, and when such a break occurred, the entire scale had to be returned to the factory for the placing in position and "tuning" a new spring, entailing a loss of time and considerable expense. By use of my invention, this loss of time and expense is reduced to a minimum, as an unskilled person can easily apply a new spring and give the same the proper tension.

I have shown one method of applying strain to the spring, but it is obvious other means may be employed for tightening the spring without departing from the spirit of my invention.

Having now fully described my invention, what I claim as new therein, and desire to secure by Letters Patent, is:

1. The combination with a torsion scale truss, of a divided spring stretched around the periphery of the truss, the ends of said spring connected to a straining block, a straining block, and means for regulating the tension of said spring by moving said block.

2. The combination with a torsion scale truss made of rigid material, of a divided spring stretched around its periphery, removable means for clamping and holding each end of the divided spring, and means, carried by the truss, for straining the spring, substantially as shown and described.

In testimony whereof I hereto affix my signature in presence of two witnesses.

ADRIAN HITT.

Witnesses:
  LOUIS F. BRAUN.
  A. M. PIERCE.